Oct. 25, 1960   C. E. POWELL, JR., ET AL   2,957,649
ELECTRIC STEERING SYSTEM
Filed Aug. 8, 1955   2 Sheets-Sheet 1

CHARLES E. POWELL, JR.
JOHN KIENER
INVENTORS

BY Lyon & Lyon
ATTORNEYS

Oct. 25, 1960 C. E. POWELL, JR., ET AL 2,957,649
ELECTRIC STEERING SYSTEM
Filed Aug. 8, 1955 2 Sheets-Sheet 2

CHARLES E. POWELL, JR.
JOHN KIENER
INVENTORS

BY Lyon & Lyon
ATTORNEYS

United States Patent Office 2,957,649
Patented Oct. 25, 1960

2,957,649

ELECTRIC STEERING SYSTEM

Charles E. Powell, Jr., and John Kiener, La Canada, Calif., assignors to Haskel Engineering Associates, Glendale, Calif., a partnership consisting of Richard L. Hayman and Don W. Driskel Filed Aug. 8, 1955, Ser. No. 526,983

3 Claims. (Cl. 244—50)

The present invention relates to an improved steering system which is particularly useful in steering or orienting the nose wheel of an aircraft.

In general, the present invention involves an electrical control system for operating a hydraulically actuated mechanism of the general character illustrated in United States Letters Patent 2,622,827 of Richard L. Hayman et al. The hydraulically actuated mechanism illustrated in such Letters Patent is, however, operated by mechanical means instead of electrical means as contemplated herein. The provision of adequate mechanical means has heretofore met with certain difficulties considering the fact that slight mechanical "play" in the interconnecting linkage or cable system would have a marked detrimental effect on the performance of the overall system. Further, the problems involved in providing such a mechanical control means or system were greatly increased considering the fact that the hydraulically operated mechanism is mounted adjacent the nose wheel which is steered or oriented from a position inside the aircraft and which is required to be moved from a retracted position inside the aircraft to an extended position and vice versa in normal landing and take-off operations. As the result, unless exacting requirements were met, the steering system would have excessive so-called "dead angle" or "dead band" and steering, in such case, would be difficult or intolerable. Difficulties of this character are obviated using an electrical control system as described herein wherein solenoid operated valve means is incorporated in the hydraulically actuated mechanism, and electrical conductors are used to conduct energizing current for such solenoid as well as to supply information as to the particular position of the nose wheel. As a matter of fact, it is necessary only that the connections between a point inside the aircraft to a point adjacent the nose wheel include means for transmitting hydraulic fluid and a flexible current carrying cable.

It is therefore a general object of the present invention to provide an improved control system of the character indicated above.

A specific object of the present invention is to provide an electrical control system for a hydraulically operated steering system.

Another specific object of the present invention is to provide an electrical control system of this character which results in a relatively small "dead band" in the related steering system.

Another specific object of the present invention is to provide a system of this character which may be quickly and easily installed on an aircraft.

Another specific object of the present invention is to provide a steering system of relatively light weight.

Another specific object of the present invention is to provide a system of this character incorporating novel means whereby operation of the steering unit is prevented when the nose wheel is in a retracted position.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
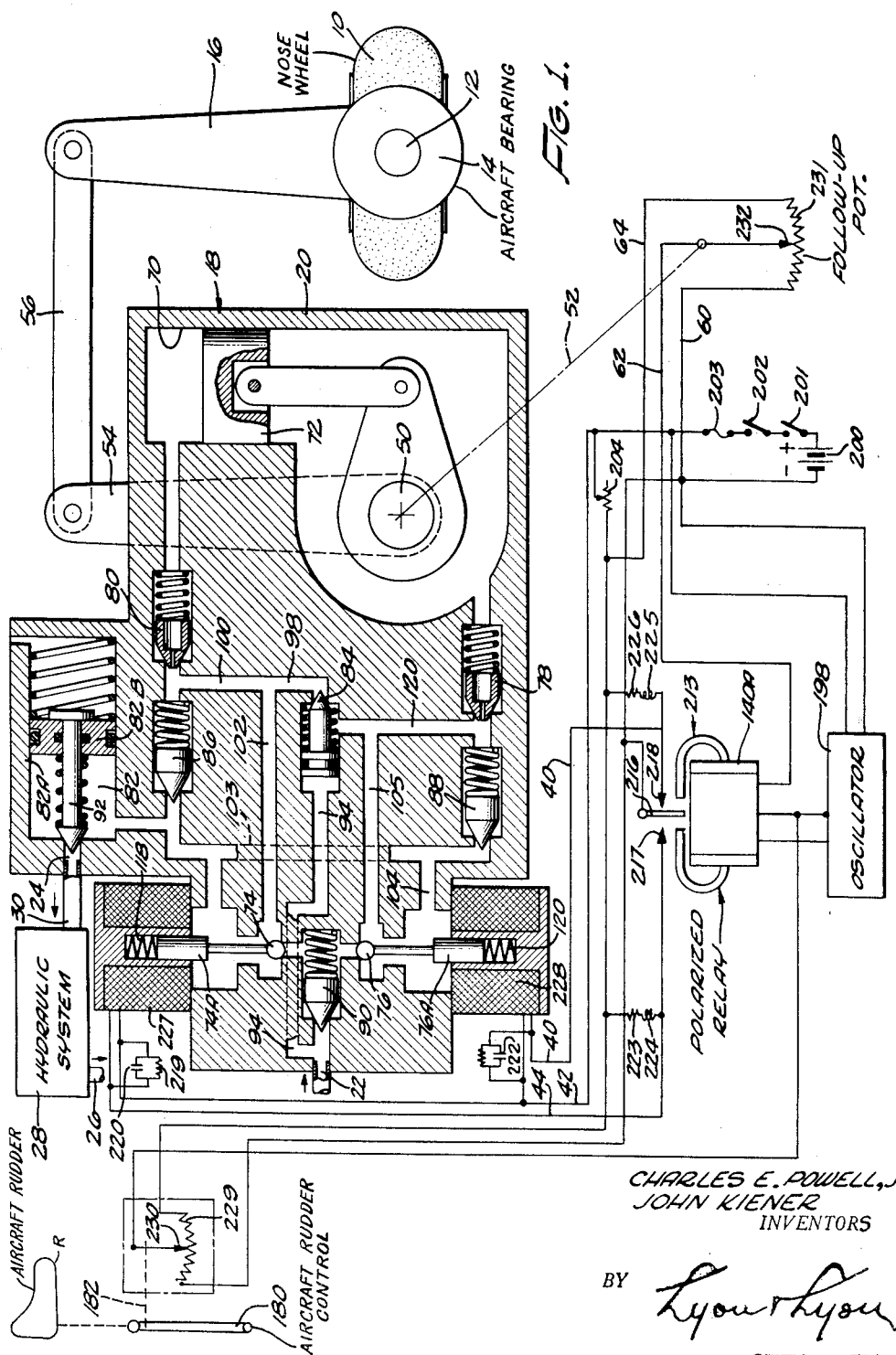
Figure 1 illustrates a steering system embodying features of the present invention, both the hydraulically operated means and the associated electrical circuitry being illustrated in schematic form, and in relationship to the nose wheel of the aircraft which is oriented or steered.

Referring to the drawings, Figure 1 shows a nose wheel 10 which, using conventional structure, is swivelly mounted on an aircraft. This nose wheel 10 is swivelled about a generally vertical axis corresponding to the axis of the shaft 12 which is illustrated as being journalled for rotation in the stationary bearing means 14 carried on the aircraft. An arm 16 has one of its ends connected to such shaft 12 and the other one of its ends attached to a hydraulically actuated mechanism having the general reference numeral 18 and which is encased in the housing 20. This housing 20 is mounted externally of the aircraft and adjacent the nose wheel 10 in the manner illustrated in the above-mentioned Letters Patent. This housing 20 includes a high pressure inlet 22 and an exhaust outlet 24. A high pressure flexible hose 26 supplies fluid under pressure to the inlet 22 from a hydraulic system inside the aircraft, such hydraulic system being designated generally by the block 28. Fluid flowing out of the outlet 24 in the casing 20 is returned to such hydraulic system 28 through the interconnecting flexible hose 30. The housing 20 has mounted thereon a pair of solenoid windings 227 and 228 for controlling the flow of fluid to such hydraulic system in the manner described later. These windings 227 and 228 are connected to flexible elongated electrical conductors 40, 42 and 44 which extend generally from the housing 20 to related electrical circuitry disposed inside the aircraft.

The housing 20 also has mounted thereon a so-called "follow-up" potentiometer type of resistance 231 having its adjustable tap 232 mechanically coupled to the rotatable shaft 50 by a mechanical connection represented by the dotted line 52 so that such tap 232 follows the movement of the nose wheel 10, it being noted that such nose wheel 10 is also moved in accordance with rotation of the shaft 50 through a linkage system which includes the crank arm 54, the link 56 and the crank arm 16.

This variable resistance 231 has its three terminals connected through the flexible electrical conductors 60, 62 and 64 to related circuitry within the aircraft.

It will be observed that those elements which are mounted adjacent the nose wheel and which are moved with the nose wheel 10 into retracted and extended positions include generally the housing 20 with the variable resistance 231 and coils 227 and 228 mounted thereon. The other related parts of the system are disposed in the aircraft and are connected thereto by the previously mentioned flexible means, namely the flexible hoses 26 and 30 and the flexible leads 40, 42, 44, 60, 62 and 64. These flexible means allow the nose wheel 10 with the housing 20 to be conveniently moved from a retracted position to an extended position with respect to the aircraft.

It is understood that electrical means instead of hydraulic means may be used to steer the nose wheel, although it is preferred to use a hydraulically actuated mechanism as presently described.

The hydraulically actuated mechanism includes generally a steering cylinder 70 containing the piston 72, a control system which involves the solenoid operated ball-shaped valve members 74 and 76 and a self-contained shimmy damper which involves the check valve members 78 and 80 having restricted openings therethrough for placing opposite sides of the double-acting piston 72 in communication. Further, the damper includes an accumulator 82 which serves to maintain pressure in the unit and to allow for thermal expansion. The pressure-operated bypass valve 84 opens when the inlet pressure is shut off to allow the unit to function as a damper. Anti-cavitation valves 86 and 88 are provided to supply fluid to the low pressure side of damper piston 72.

The inlet and outlet ports 22 and 24, respectively, have associated therewith the check valves 90 and 92 to maintain pressure in the housing 20 in case of a fluid pressure failure, as for example in the hydraulic system 28 or in the flexible connecting hoses 26 and 30.

When pressure is applied to the inlet port 22, such pressure is applied through the channel 94 to the spring biased bypass valve 84 to cause the same to close so as to close the bypass channel 98. In such case, however, fluid may flow from one side of the piston 72 to the other side in the following path: from the upper side of piston 72 through the restricted opening in the spring biased check valve 80, through the channel 100, through the channel 102, through the channel 103, through the channel 104, through the channel 105, and through the restricted opening in the spring biased check valve 78 to the lower side of the piston 72. The hydraulic fluid, for example oil, may thus flow from one side of the piston to the other side to damp the movement of such piston 72 and the attached nose wheel 10.

In order to assure a pressure in this fluid damping circuit which is described above and to allow for thermal expansion, the accumulator 82 having the cylinder 82A and the piston 82B is provided. The cylinder 82A is in communication at all times with the channel 103 which forms a part of such damping circuit, and, in this condition, the spring biased check valve member 92, which is slidably mounted on the piston 82B, seals the outlet port 24.

When it is desired to change the oriented position of the nose wheel 10, i.e. to accomplish steering, either the valve member 74 or the valve member 76 is opened, depending upon which direction it is desired to move such nose wheel 10. These valve members 74 and 76 are normally pressed into valve closing position by the associated compression springs 118 and 120. The valve member 74 is opened by energizing the solenoid winding or coil 227 that serves to attract the core member 74A and likewise the valve member 76 is opened by energizing the solenoid winding or coil 228 to attract the core member 76A. Thus, when the winding 227 is energized and the valve member 74 thus moves to valve opening position, fluid may flow from the inlet ports 22 to the upper side of the piston 72 in the following path: from the inlet port 22 past the spring biased check valve member 90 which is automatically opened by the pressure, past the valve member 74 through the channel 102, through the channel 100, past the spring biased check valve member 80 which is opened by such pressure and to the upper side of the piston 72 to cause the piston 72 to move downwardly and to displace liquid on the lower side of such piston 72 through the following path. This path extends from the lower side of piston 72, through the restricted opening in the spring biased check valve 78, through the channel 120, through the channel 105, through the channel 104, through the channel 103, through the cylinder 82A, and past the check valve 92 to the outlet 24. It is noted, at this particular condition, the valve 92 is caused to move to its open position as a result of movement of the piston 82B to the right, occasioned by the pressure developed in the cylinder 82A. It is noted also that steering, as described above, results in the accumulator 82 becoming charged. In other words, each time a steering operation is performed, the accumulator 82 is charged to assure its continued operation.

Thus, as the piston 72 moves downwardly, the shaft 50 is rotated clockwise, the link 56 is moved to the right in Figure 1, and the crank arm 16 is rotated clockwise to change the orientation of the nose wheel 10. It will be clear, from the following description, that reverse movement of the nose wheel 10 is accomplished by moving the valve member 76 to its open position while allowing the other valve member 74 to remain closed.

In such case, fluid enters the inlet 22, flows past the check valve 90, flows past the valve element 76, through the channel 105, through the channel 120, past the check valve 78 which is opened by the pressure acting thereon, and then to the lower side of the piston 72 to cause it to move upwardly and displace fluid which flows in the following path. This path extends from the upper side of the piston 72, through the restricted opening in the check valve 80, through the channel 100, through the channel 102, into the accumulator cylinder 82A, and then out through the outlet 24, the valve member 92 being moved to its open position upon movement of the piston 82B to the right, occasioned by the pressure in the cylinder 82A. Thus, here again the accumulator 82 is again charged to assure its continued desirable function.

It is thus observed that steering, either to the right or to the left, involves the selective energization of the electrically energizable solenoid coils 227 and 228. The manner in which these coils 227 and 228 are selectively electrically energized is now described in connection with Figures 1 and 2.

In general, the solenoid coils 227 and 228 are energized in accordance with the energized condition of the polarized relay 213 which has the windings 214 and 215 (Figure 2) and a related single pole-double throw switch having the pair of stationary contacts 217 and 218 cooperating with the movable part comprising contact or core member 216. It is noted that the coil 227 may be energized with current which may flow in the following path. This path extends from the positive terminal of the voltage source 200, the "on-off" switch 201, the safety switch 202, fuse 203, coil 227, contact 217 and the movable switch contact 216. Similarly, it is observed that the other solenoid coil 228 may be energized with current which may flow through the following path. This path extends from the positive terminal of the source 200, through the switches 201, 202, fuse 203, through winding 228, switch 218, 216 and to the negative terminal of the source 200.

It is also observed that the movable contact 216 of the relay has actually three positions, namely, a first position as illustrated in Figure 1 which corresponds to a condition of zero current flow in the winding 215. A second position corresponds to the condition wherein the movable contact 216 engages the contact 217, and this corresponds to a condition wherein the current flow through the winding 215 is, for example, of a positive polarity. A third position corresponds to a current flow through the coil 214 of negative polarity which results in the movable contact 216 engaging the stationary contact 218.

Figure 2:
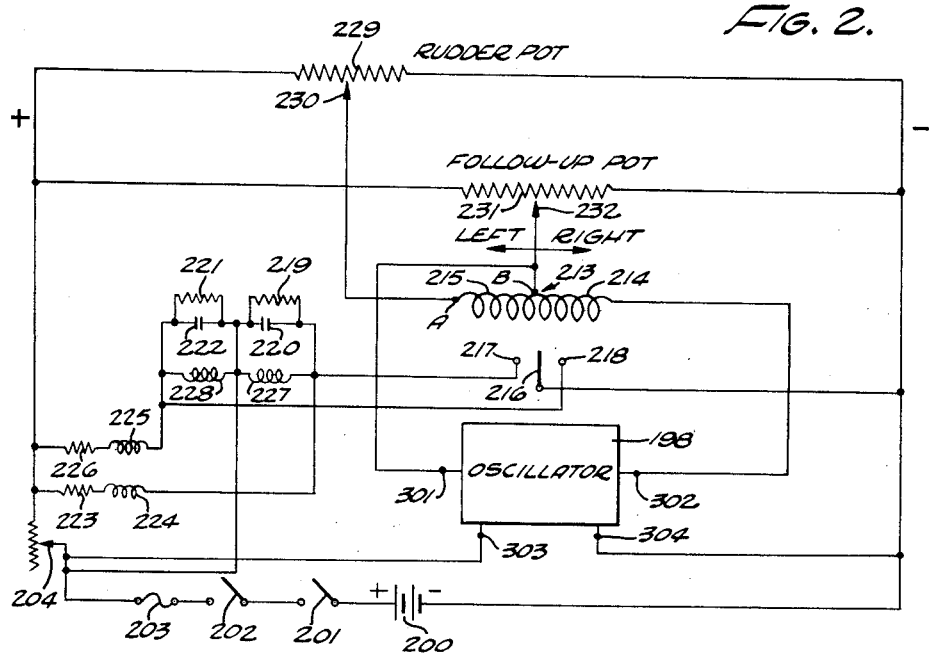
Figure 2 illustrates more clearly some of the electrical circuitry shown in Figure 1.

The relay winding 215 is subjected to currents of zero magnitude, "positive" and "negative" polarity, by connecting the same in the so-called "galvanometer" arm or output circuit of a Wheatstone type of bridge circuit which is more clearly drawn as Figure 2.

As shown in Figure 2, the potentiometer type of resistance 231 has its outside terminals connected through adjustable resistance 204 to opposite terminals of the source 200 to provide a first voltage dividing circuit. The battery voltage is "divided" in accordance with the position of the adjustable tap 232, which, as shown in Figure 1, is mechanically coupled to the nose wheel 10 so that such tap 232 is adjusted in accordance with movement of the nose wheel 10. A second voltage dividing circuit is provided by the resistance 229, the outside terminals of such resistance being connected to opposite terminals of the source 200 through resistance 204. The movable tap 230 of resistance 229 is connected to one terminal of the relay winding 215, the other terminal of the winding 215 being connected to the aforementioned tap 232. The tap 230 on the resistance 229 is adjusted in accordance with the movement of the rudder control. For this purpose, as illustrated in Figure 1, the movable tap 230 is mechanically coupled to the rudder control 180 through a mechanical connection represented by the dotted line 182. The rudder control 180 controls the rudder R.

It is thus observed, with the circuitry thus far specifically described, that the current flowing through the winding 215 may be of zero value, of positive polarity or negative polarity, depending upon the particular positions of the taps 230 and 232. As a matter of fact, the bridge circuit is self-balancing in that the tap 232 is automatically moved to an adjusted position wherein the bridge becomes balanced. When the bridge is balanced, and subject to the exception described below, there is, theoretically, no current flowing through the winding 215. This corresponds to the condition wherein both of the valve elements 74 and 76 (Figure 1) are in their closed position as illustrated. The bridge, however, becomes unbalanced when the tap 230 is moved by the rudder control 180. Consequently, the current of either negative or of positive polarity flows through the relay winding 215, but such current is gradually reduced to zero upon the resulting movement of the tap 232.

While satisfactory results may possibly be obtained using a bridge circuit as described above, preferably for purposes of reducing the so-called "dead band" of the system, a relatively small alternating or oscillatory current is supplied to the relay winding 214, and such current has the effect of modifying the effect of the current which flows through the winding 215 as a result of the bridge unbalance.

For this purpose, the output of the oscillator 198 is applied to the winding 214 so that at all times a small alternating or oscillatory current flows through such winding 214. The oscillatory current is derived from a transistor oscillator amplifier, described later in connection with Figure 3.

Figure 3:
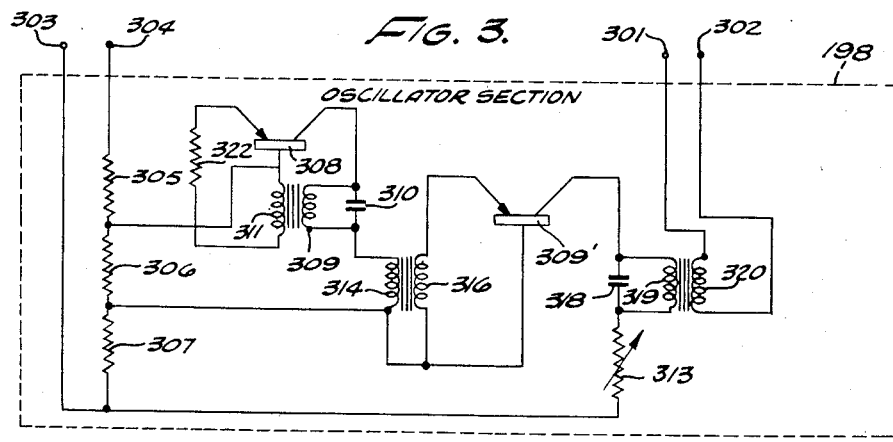
Figure 3 is a schematic diagram illustrating one form of oscillator which is illustrated as such in Figure 1.

The current through coil 214 is of an oscillatory nature and of a value such that the armature 216 swings almost to engage contacts 217 and 218 each cycle of the alternating current. The rate of this swing is determined by the frequency of the oscillator 198, and the amplitude is controlled by the gain which is established by adjustment of the variable resistance 313 in the oscillator (Figure 3).

Thus, this current through coil 215 serves as a magnetic bias on the armature 216. In other words, when a small current flows through coil 215 in a direction to cause the armature 216 to approach but not touch contact 217, each time the current through coil 214 causes the armature 216 to swing toward contact 217, a value is reached when contact is made to energize the valve coil 227. As the current through coil 215 is increased, the critical value of the current through coil 214 is decreased to allow longer and longer energization of valve coil 227 each cycle of the alternating current until finally full contact is made for the duration of a cycle. The series of pulses of hydraulic fluid pressure resulting from this action are damped by the mass of the wheel and tire and the "spring" of the mechanical parts of the system into a smooth metered flow.

Thus, the operation of the electrical control system may be described briefly as follows. Assuming that the tap 230 on the resistance 229 is displaced to the left in Figure 2, the terminal A of the winding 215 is more positive than the terminal B of such winding 215, and a balancing current flows from terminal A to terminal B. If the voltage difference between the terminals A and B is sufficient to exceed the pull-in voltage of the relay, the right steering valve coil 227 is energized, causing the hydraulic fluid to enter the cylinder 70 (Figure 1) in a direction that causes the piston 72 to move the nose wheel 10 to the right. This movement results in changing the position of the mechanically coupled tap 232 on the potentiometer resistance 231 in such a direction as to cause the potential difference between terminals a and B to be reduced, in which case the winding 227 is de-energized and the movement of the nose wheel 10 is stopped. In the event that the nose wheel 10 should be displaced to the right by a rut in the ground or drift of the aircraft, the terminal B may then become more positive than the terminal A, and the current may flow from terminal B to terminal A through the relay winding 215 to cause the left solenoid winding 228 to become energized to correct the position of the nose wheel.

However, since the polarized relay 213 requires a definate but relatively small pull-in voltage (i.e. the current through the coil 215 must exceed a predetermined threshold value in order to initiate movement of the contact arm 216) to operate the contact arm 216 in either one of its two directions of movement, and since the solenoid operated valve renders a positive shut-off, the steering system may have what is termed to a "dead band," i.e. a region of operation wherein changing current flowing through the winding 215 does not produce any control effect. Presence of such "dead band" imparts a rather "jerky" feel to the steering system. It is, however, possible to position quite accurately without the use of the oscillator 198. The addition of the oscillator 198 has the effect of reducing the so-called "dead angle" or "dead band." This oscillator 198, as described later, supplies a low-frequency alternating current through the relay coil 214. The magnitude of this current is adjusted to cover the "dead band" imparted by the particular relay 213. When used with a high speed valve, a minute displacement of the rudder resistance tap 230 causes the relay to be recurrently operated so as to cause a series of short pulses of hydraulic fluid to flow into the steering cylinder 70. With further displacement of the rudder resistance tap 230, the pulses of hydraulic fluid are longer, but occur at the same frequency. The mass of the piston 72 and the elements connected thereto, as well as the snubbing of the valve and the spring action of the oil and tire integrates this into a smooth movement of the nose wheel. Thus, for larger displacements of the control rudder R, the valve remains open a greater portion of each cycle until it remains open all of the time.

This allows the pilot to obtain the small slow motions required for high speed steering and the large rapid motions required for low speed steering without requiring large movements of the control elements or "shifting of gears" in the control set-up.

Preferably, the hydraulic system is so arranged that the follow-up potentiometer 231, as well as the solenoid valves, may be removed therefrom without affecting the electrical connections or seals of the remaining parts so as to allow more easy and convenient servicing.

Figure 4:
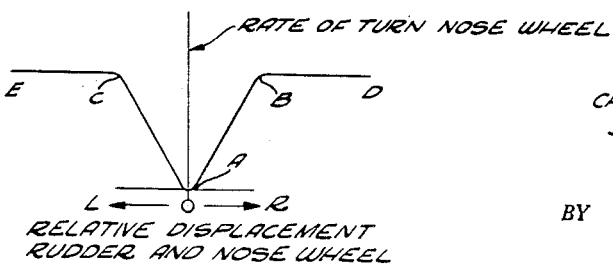
Figure 4 is a graphical representation serving to illustrate certain operating features of the present system when using an oscillator.

The system using the oscillator may thus be adjusted so that "dead band" may be minimized or substantially eliminated, as illustrated in the graphical representation of Figure 4 wherein the relative displacement of the rudder and nose wheel is plotted graphically with respect to the rate of turn of the nose wheel. Thus, as illustrated in Figure 4, when the rudder is in the central position as indicated by the letter O, the nose wheel is in a corresponding central position and is, of course, stationary so that the rate of turn is zero. However, the rudder control is actuated and the nose wheel is turned at a rate which is dependent upon the amount of displacement of such rudder control. This relation between rudder control displacement and rate of turn of the nose wheel is substantially linear, as illustrated by the rising linear sloped lines in Figure 4. This operation, as represented by the line AB for right rudder displacement and along the line AC for left rudder displacement, results from the fact that for increased displacement of the rudder control in these ranges, the corresponding solenoid valve remains open for larger intervals. When the rudder control 180 is displaced a relatively large amount with respect to the orientation of the nose wheel, the corresponding solenoid valve remains open to produce a rate of turn of the nose wheel represented by the horizontal lines BD or CE, as the case may be. Thus, the rate of turn of the nose wheel may be controlled by adjusting the amount of relative displacement of the rudder control. Of course, the nose wheel is moved by the rudder control 180 in such a direction as to tend to decrease the relative displacement between such rudder control and the nose wheel so that eventually, after the steering operation, the relative displacement between the rudder control and the nose wheel is represented by the point O in Figure 4. Since the lines AB and AC in Figure 4 terminate at point O, Figure 4, this illustrates the absence of any "dead band" or "dead angle." In other words, slight movement of the right or left rudder control serves to produce motion of the nose wheel in such a direction as to render the relative displacement between the two equal to zero.

The oscillator 198 (Figure 2) preferably is in the form of a transistor oscillator shown in Figure 3 having an adjustable resistance 313 for controlling the amplitude of the pulsating or alternating output voltage appearing on output terminals 301, 302. A small continuous voltage is applied to the oscillator through input terminals 303, 304, and, more specifically, to a voltage dividing network which includes the series connected resistances 305, 306 and 307 so as to apply operating voltages to the transistors 308 and 309'. When such voltage is applied, a small voltage is thus applied across the base collector circuit of transistor 308 by circuitry which involves the inductance 309 and condenser 310. A portion of the transient current is applied in phase to the emitter through inductance 311. The inductances 309 and 311 are windings of a transformer. The transistor 6 thus starts oscillations which the frequency being determined by inductance 309 and condenser 310, and oscillating currents flow through transformer winding 314. A voltage induced in transformer winding 316 is applied to the base emitter circuit of transistor 309' which serves to remove the positive peaks of the applied signal by diode action. The negative going portions of the signal drive transistor 309' into full conduction. Condenser 318 and inductance coil 319 serve as wave shaping elements. Coil 319 is a transformer winding which is coupled to the output winding 320. The open circuit square wave at the collector base terminal of transistor 309' is thus shaped into a sine wave. The transformer comprising windings 319, 320 serve to match the high output impedance of the transistor circuit to the low impedance of winding 214 (Figure 2).

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:
1. In a control system of the character described, a controlling element, first impedance means controlled in accordance with movement of said element, a controlled element, second impedance means controlled in accordance with movement of said controlled element, said first and second impedance means being electrically interconnected in a network, voltage responsive means connected in said network and operated in accordance with the relative magnitudes of said first and second impedance means, said voltage responsive means comprising a relay having fixed contacts and a movable contact, means normally biasing said movable contact to a position midway between said fixed contacts, and means for vibrating said movable contact toward and from said fixed contacts without engaging them independently of the relative magnitudes of said first and second impedance means, and means responsive to said relay for effecting movement of said controlled element.

2. In a control system of the character described, a mechanism for orienting a nose wheel adapted for use on aircraft, said mechanism including a pair of solenoid operated means for controlling the movement of said nose wheel in opposite directions, first impedance means adjusted in accordance with movement of said nose wheel, manually operated steering control means, second impedance means adjusted in accordance with movement of said steering control means, a direct current bridge circuit including said first and said second impedance means, a relay connected in said bridge circuit and operated in accordance with the unbalanced condition of said bridge circuit, said relay thereby selectively controlling said pair of solenoid means, and a source of varying voltage connected to said relay for causing intermittent operation thereof upon initial unbalance of said bridge circuit.

3. In a control system of the character described, a mechanism for orienting a steering wheel adapted to be used on aircraft, said mechanism including means for controlling movement of said wheel in opposite directions, first impedance means adjusted in accordance with movement of said wheel, manually operated steering control means, second impedance means adjusted in accordance with movement of said steering control means, said first and second impedance means being electrically interconnected in an electrical network, relay means having fixed contacts and a movable contact therebetween and connected in said network with said first and second impedance means and operated in accordance with the relative magnitude of said first and second impedance means, means biasing said movable contact to a position midway between said fixed contacts, means independent of said first and second impedance means for oscillating said movable contact continuously without engaging said fixed contacts, and means operated by said relay means for operating said mechanism.

References Cited in the file of this patent

UNITED STATES PATENTS

| | | |
|---|---|---|
| 2,423,524 | Side | July 8, 1947 |
| 2,532,723 | Knoop | Dec. 5, 1950 |
| 2,621,002 | Pittman | Dec. 9, 1952 |
| 2,768,359 | Side | Oct. 23, 1956 |